United States Patent [19]

Richardson, Jr.

[11] Patent Number: 5,044,904

[45] Date of Patent: Sep. 3, 1991

[54] MULTI-PIECE SCROLL MEMBERS UTILIZING INTERCONNECTING PINS AND METHOD OF MAKING SAME

[75] Inventor: Hubert Richardson, Jr., Brooklyn, Mich.

[73] Assignee: Tecumseh Products Company, Tecumseh, Mich.

[21] Appl. No.: 466,500

[22] Filed: Jan. 17, 1990

[51] Int. Cl.[5] ........................ F04C 18/04; F04C 27/00; F16B 9/02; F16B 17/00

[52] U.S. Cl. .................................. 418/55.2; 418/55.4; 29/525.1; 29/888.022; 403/378

[58] Field of Search ........................ 418/55.2, 55.4, 57; 29/525.1, 888.022; 403/378, 379

[56] References Cited

U.S. PATENT DOCUMENTS

| | | | |
|---|---|---|---|
| 3,613,221 | 10/1971 | Pronk | 29/525.1 |
| 3,986,799 | 10/1976 | McCullough | 418/56 |
| 3,994,635 | 11/1976 | McCullough | 418/57 |
| 4,436,495 | 3/1984 | McCullough | 418/55.2 |
| 4,457,676 | 7/1984 | Hiraga | 418/57 |
| 4,463,591 | 8/1974 | McCullough | 72/360 |
| 4,466,784 | 8/1984 | Hiraga | 418/104 |
| 4,475,875 | 10/1984 | Sugimoto et al. | 418/151 |
| 4,487,248 | 12/1984 | Fukushima et al. | 164/131 |
| 4,487,560 | 12/1984 | Uchikawa et al. | 418/178 |
| 4,550,480 | 11/1985 | Tanikawa et al. | 29/888.022 |
| 4,639,201 | 1/1987 | Caillat | 418/55.2 |
| 4,691,685 | 9/1987 | Dempsey | 29/525.1 |
| 4,747,763 | 5/1988 | Sibata et al. | 403/379 |

FOREIGN PATENT DOCUMENTS

| | | | |
|---|---|---|---|
| 59-79092 | 5/1984 | Japan | 418/55.2 |

*Primary Examiner*—John J. Vrablik

*Attorney, Agent, or Firm*—Jeffers, Hoffman & Niewyk

[57] ABSTRACT

A scroll-type hermetic compressor is disclosed including within a hermetically sealed housing a fixed scroll member assembly, an orbiting scroll member assembly, a frame member, and a crankshaft. The fixed and orbiting scroll member assemblies each include a separately formed involute wrap member interconnected with a plate member by means of a plurality of pin members received within corresponding axial bores in the wrap member and plate member, respectively. The plate member of the fixed scroll member assembly is mounted to the frame member, while the plate member of the orbiting scroll member assembly is mounted to a drive hub member operably coupled to the crankshaft. In one embodiment, the interconnecting pin members fit loosely within the bores in the wrap member such that the wrap member is movable with respect to the plate member, thereby providing radial compliance between the fixed and orbiting scroll member assemblies during compressor operation.

20 Claims, 5 Drawing Sheets

MULTI-PIECE SCROLL MEMBERS UTILIZING INTERCONNECTING PINS AND METHOD OF MAKING SAME

BACKGROUND OF THE INVENTION

The present invention relates generally to a hermetic scroll-type compressor and, more particularly, to such a compressor having intermeshing fixed and orbiting scroll member assemblies, wherein each assembly comprises a separate involute wrap element connected to an end plate assembly.

A typical scroll compressor comprises two facing scroll members, each having an involute wrap, wherein the respective wraps interfit to define a plurality of closed pockets. When one of the scroll members is orbited relative to the other, the pockets travel between a radially outer suction port and a radially inner discharge port to convey and compress the refrigerant fluid.

It is generally believed that the scroll-type compressor could potentially offer quiet, efficient, and low maintenance operation in a variety of refrigeration system applications. However, several design and manufacturing problems persist that have prevented the scroll compressor from achieving wide market acceptance and commercial success. For instance, the fixed and orbiting scroll members are somewhat difficult and expensive to fabricate, thereby increasing the cost of a scroll-type compressor relative to other compressor types, e.g., reciprocating piston and rotary vane.

There are two basic constructional alternatives for fabricating scroll members, namely, forming them from a single piece of metal by machining out the involute wrap, or forming the involute wrap and end plate separately and then joining them into a finished scroll member. Fabricating an integrally formed scroll member requires excessive amounts of time and energy, and produces large quantities of waste metal. Also, computer-controlled milling machines used in mass production of these scroll members are quite expensive. Several methods of connecting a separately formed involute wrap to an end plate to form a scroll member have been proposed; however, none appears to have proven economically feasible for the purpose of mass producing scroll-type compressors.

The present invention is directed to overcoming the aforementioned problems associated with scroll-type compressors, wherein it is desired to provide an improved design for and method of manufacturing fixed and orbiting scroll members in order to reduce the manufacturing difficulty and costs associated therewith.

SUMMARY OF THE INVENTION

The present invention overcomes the problems and disadvantages of the above-described prior art compressors by providing an improved scroll member assembly and method for making same, wherein a separately formed involute wrap member is interconnected with a plate member by means of a plurality of pin members the ends of which are received within corresponding axial bores in the wrap member and plate member, respectively.

More specifically, the present invention provides, in one form thereof, an involute wrap member having a planar involute axial end surface and a plate member having a planar face surface. A plurality of axially aligned bores are provided in both the wrap member, opening onto the axial end surface, and the plate member, opening onto the face surface. The wrap member and plate member are interconnected by a plurality of pin members, each of which is received within corresponding bores in the wrap member and plate member, respectively.

In one aspect of the invention, the axial bores in either the wrap member or the plate member are oversized with respect to the pin members, whereby the pin members are loosely received therein. In this arrangement, the wrap member is capable of moving relative to the plate member to perform radial compliance of the orbiting scroll member with the fixed scroll member during compressor operation.

According to another aspect of the present invention, the scroll member assembly is used as either the fixed scroll member or the orbiting scroll member of a scroll-type compressor, depending upon whether the plate member of the assembly is mounted to a stationary frame member or an orbiting drive hub member.

An advantage of the scroll member assembly of the present invention is that a separately formed involute wrap member may be easily interconnected with a plate member, thereby facilitating mass production of scroll-type compressors.

Another advantage of the scroll member assembly of the present invention is that involute wrap members and plate members fabricated of different materials may be operably interconnected.

Another advantage of the scroll member assembly of the present invention is that a scroll member may be manufactured with minimal machining operations, thereby reducing manufacturing time and costs.

A further advantage of the scroll member assembly of the present invention, according to one form thereof, is that the assembly may be incorporated into a scroll-type compressor as either an orbiting scroll member or a fixed scroll member.

Yet another advantage of the scroll member assembly of the present invention, in one form thereof, is that relative movement between the wrap member and the plate member is possible, thereby enabling radial compliance between cooperating scroll members.

The invention, in one form thereof, provides a scroll member assembly for use as one of a fixed scroll member and an orbiting scroll member in a scroll-type compressor. The scroll member assembly includes an end plate member having a planar face surface, and an involute wrap member extending involutely about a central axis and having a planar involute axial end surface. The wrap member is disposed adjacent the plate member such that the involute axial end surface and the face surface define a planar involute interface therebetween. Spaced along the planar involute interface is a mechanism for interconnecting the wrap member and the plate member. Specifically, a plurality of axial bores in the wrap member open onto the involute axial end surface, and a corresponding plurality of axial bores in the plate member open onto the face surface. Each one of the plurality of axial bores in the wrap member is axially aligned with a respective one of the plurality of axial bores in the plate member. The interconnecting mechanism further includes a plurality of pin members, each of which is received within a respective bore in the plate member, extends across the planar involute interface, and is received within a corresponding bore in the wrap member.

In accord with one aspect of the previously described form of the present invention, either the bores in the wrap member or the bores in the plate member are oversized with respect to the corresponding pin members received therein. Consequently, the wrap member is movable with respect to the plate member in a plane parallel to the planar involute interface between the involute axial end surface of the wrap member and the face surface of the plate member. In this manner, radial compliance of the scroll member assembly with a cooperating other scroll member in a compressor application is possible.

The invention further provides, in one form thereof, a method of fabricating a scroll member assembly for use in a scroll-type compressor. A first step of the method is providing an involute wrap member extending involutely about a central axis and having a planar involute axial end surface. A plurality of axial bores are provided in the wrap member so as to open onto the involute axial end surface thereof. Another step is providing a plate member having a planar face surface. A plurality of axial bores are provided in the plate member so as to open onto the face surface, wherein each of bores in the plate member corresponds to a respective bore in the wrap member. A further step of the method is providing a plurality of pin members corresponding to both the bores in the wrap member and the bores in the plate member. Each pin member has one end adapted to be received within a bore in the wrap member and another end adapted to be received within a corresponding bore in the plate member. A step of interconnecting the wrap member and the plate member is performed by placing the involute axial end surface of the wrap member adjacent the face surface of the plate member such that the plurality of axial bores in the wrap member are correspondingly axially aligned with the plurality of axial bores in the plate member, and the plurality of pin members extend between and have their respective ends received within corresponding axially aligned bores in the wrap member and the plate member, respectively.

DESCRIPTION OF THE PREFERRED EMBODIMENT

Figure 1:
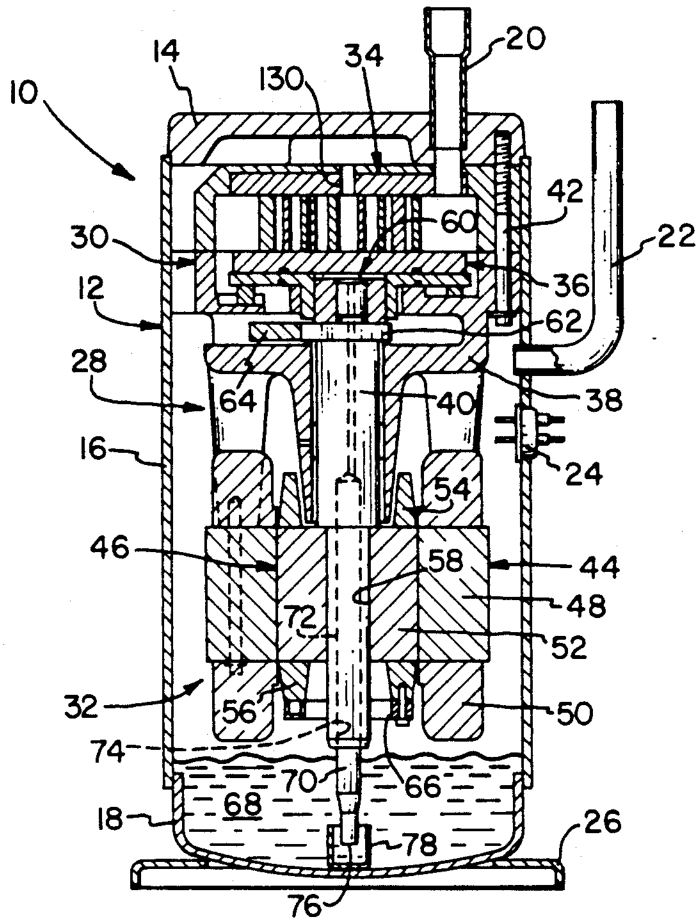
FIG. 1 is a longitudinal sectional view of a hermetic scroll-type compressor of the type to which the present invention pertains.

Referring now to FIG. 1, there is shown a hermetic scroll compressor 10 to which various embodiments of the present invention are applicable, as described hereinafter. Compressor 10 includes a housing 12 comprising a top cover plate 14, a central portion 16, and a bottom portion 18, wherein the three housing portions are hermetically joined, as by welding. Housing 12 includes a suction inlet 20, a discharge outlet 22, and an electrical terminal cluster 24. A mounting plate 26 is welded to bottom portion 18 for mounting the housing in a vertically upright position.

Disposed within housing 12 is a motor-compressor unit 28 comprising a scroll compressor mechanism 30 and an electric motor 32. Scroll compressor mechanism 30 includes a fixed scroll member assembly 34, an orbiting scroll member assembly 36, and a frame member 38. A crankshaft 40 is rotatably journalled in frame member 38, and is operably coupled to orbiting scroll member assembly 36 to effect orbiting motion thereof relative to fixed scroll member assembly 34, thereby causing compression of refrigerant. Accordingly, refrigerant entering suction inlet 20 is compressed and discharged into the housing interior prior to exiting through discharge outlet 22. A plurality of bolts 42 extend through frame member 38 to mount compressor mechanism 30 to top cover plate 14.

Electric motor 32 includes a stator assembly 44 and a rotor assembly 46 that is rotatable about a generally vertical axis. Stator assembly 44 comprises a cylindrical core 48 and windings 50. Rotor assembly 46 comprises a laminate central portion 52 and cast upper and lower end rings 54 and 56, respectively. Central portion 52 has a central aperture 58 provided therein into which is coaxially secured crankshaft 40 by an interference fit. Accordingly, crankshaft 40 is drivingly engaged by rotor assembly 46, whereby motor 32 provides a drive mechanism for compressor mechanism 30.

Figure 2:
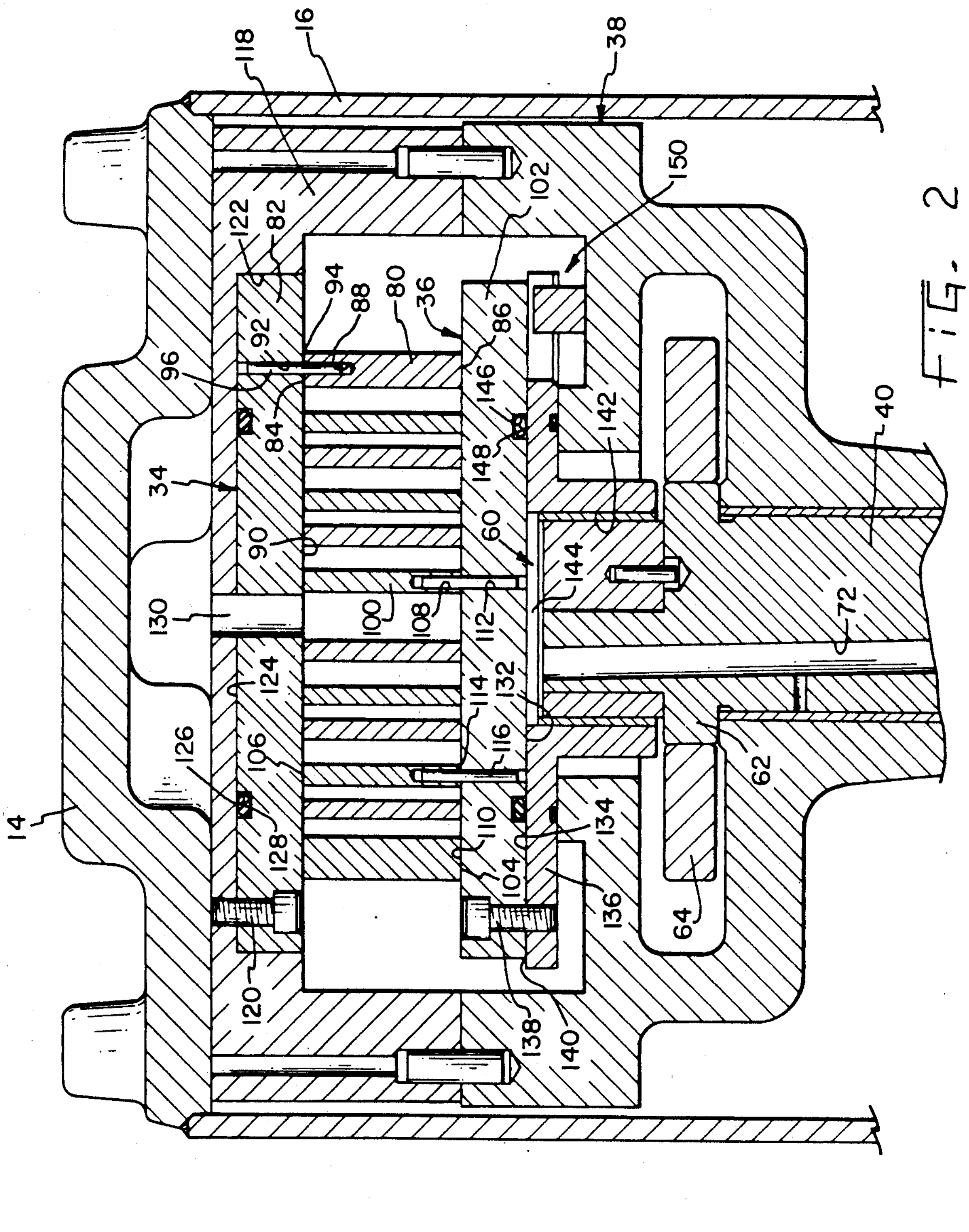
FIG. 2 is an enlarged fragmentary sectional view of the compressor of FIG. 1, particularly showing fixed and orbiting scroll member assemblies in accordance with one embodiment of the present invention.

Referring now to FIGS. 1 and 2, the upper end of crankshaft 40 includes an eccentric crankpin and roller assembly 60, which operably engages the underside of orbiting scroll member assembly 36. Crankshaft 40 also includes a thrust plate 62, intermediate orbiting scroll member assembly 36 and frame member 38, to which is attached a counterweight 64. In order to oounterbalance the rotating masses associated with orbiting scroll member assembly 36, a counterbalance weight assembly 66 comprising an arc-shaped weight is attached to lower end ring 56 of rotor assembly 46.

Housing 12 includes an oil sump 68 in the bottom thereof, from which oil is supplied to the compressor mechanism by means of an oil lubrication system which comprises an oil pick-up tube 70 and a vertical oil passageway 72 in crankshaft 40. More specifically, oil pick-up tube 70 is press fit into a counterbore 74 in the lower end of crankshaft 40, and functions upon rotation of crankshaft 40 to draw oil from sump 68 and pump oil upwardly through passageway 72. Oil inlet end 76 of oil pick-up tube 70 extends into the top opening of an oil cup 78, which is welded to the bottom surface of housing bottom portion 18.

Figure 3:
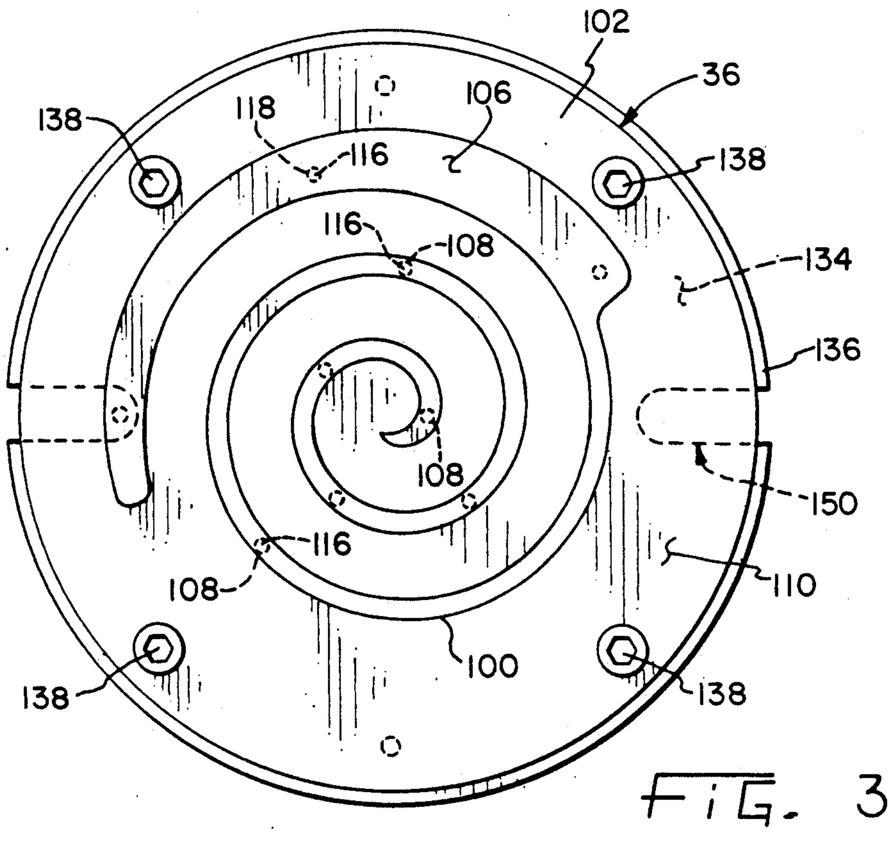
FIG. 3 is an enlarged top view of the orbiting scroll member assembly of the compressor of FIG. 1.
Figure 4:
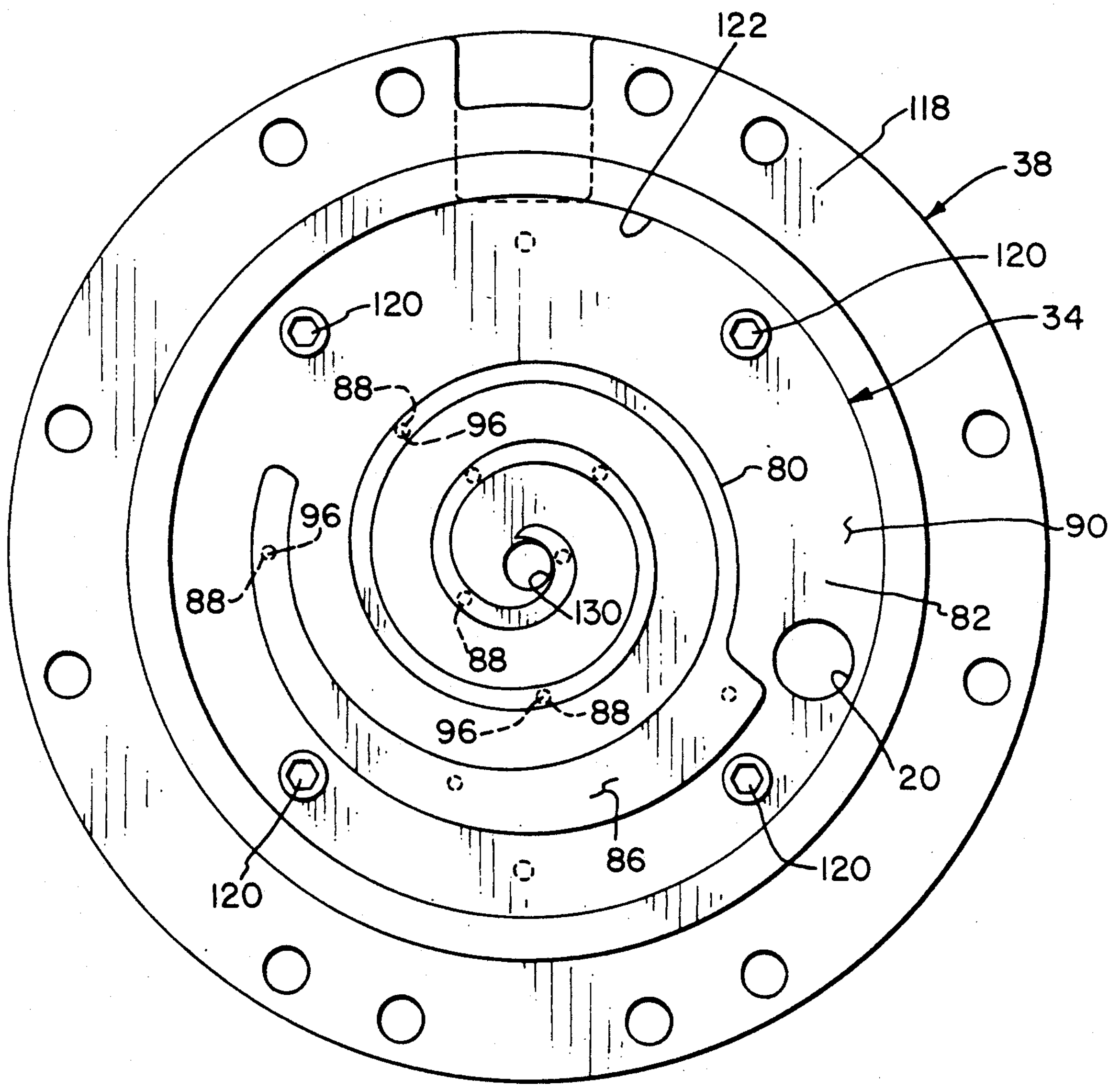
FIG. 4 is an enlarged bottom view of the fixed scroll member assembly of the compressor of FIG. 1.

Referring now to FIGS. 2-4, fixed scroll member assembly 34 and orbiting scroll member assembly 36 will now be described in accord with one embodiment of the invention. Specifically, fixed scroll member assembly 34, as shown in FIGS. 2 and 4, includes a separately formed involute wrap member 80 and an end plate member 82 to which wrap member 80 is operably connected, as described hereinafter. Wrap member 80 extends involutely about an imaginary central axis and includes planar involute end surfaces 84 and 86 at opposite axial ends thereof. A plurality of spaced, axial blind bores 88 are provided in wrap member 80 and open onto involute end surface 84, as best shown in FIG. 2.

Plate member 82 of fixed scroll member assembly 34 includes a planar face surface 90 onto which open a plurality of axial bores 92 corresponding in number and position to blind bores 88. Specifically, each bore 92 extends through plate member 82 and opens onto face surface 90, and is axially aligned with a respective blind bore 88 when wrap member 80 is placed operably against plate member 82. Placement of involute end surface 84 adjacent planar face surface 90 defines a planar involute interface 94 therebetween.

Wrap member 80 remains operably connected to plate member 82 by means of a plurality of pin members 96, each having one end received within a respective blind bore 88 in wrap member 80 and another end received within a corresponding respective bore 92 in plate member 82. Accordingly, pin members 96 cross through interface 94. In the embodiment FIGS. 2-4, pin members 96 are close-clearance fit, e.g., press fit, within both blind bores 88 in wrap member 80 and bores 92 in plate member 82.

Orbiting scroll member assembly 36 is of the same general construction as that of previously described fixed scroll member assembly 34. Specifically, assembly 36, as shown in FIGS. 2 and 3, includes a separately formed involute wrap member 100 and an end plate member 102 to which wrap member 100 is operably connected. Wrap member 100 includes planar involute end surfaces 104 and 106. A plurality of blind bores 108 in wrap member 100 open onto involute end surface 104, as shown in FIG. 2.

Plate member 102 includes a planar face surface 110 onto which open a plurality of axial bores 112 corresponding in number and position to blind bores 108. Bores 112 open onto face surface 110 and are axially aligned with a blind bores 108. A planar involute interface 114 is defined between involute end surface 104 and planar face surface 110.

Wrap member 100 is connected to plate member 102 by means of pin members 116. The respective ends of each pin 116 are received within a blind bore 108 in wrap member 100 and a corresponding respective bore 112 in plate member 102, respectively. Accordingly, pin members 116 cross through interface 114. In the embodiment FIGS. 2-3, pin members 116 are close-clearance fit, e.g., press fit, within both blind bores 108 in wrap member 100 and bores 112 in plate member 102.

As illustrated in FIGS. 2 and 4, plate member 82 of fixed scroll member assembly 34 is mounted to an upper portion 118 of frame member 38 by means of four countersunk screws 120. More specifically, plate member 82 is received and retained within a recess 122 in upper portion 118. As shown in FIG. 2, plate member 82 includes a planar back surface 124 having an annular seal groove 126 in which is housed an annular elastomeric O-ring seal 128 intermediate plate member 82 and upper portion 118. This provides an effective seal against radially outward leakage of discharged refrigerant from a central discharge port 130.

Figure 10:
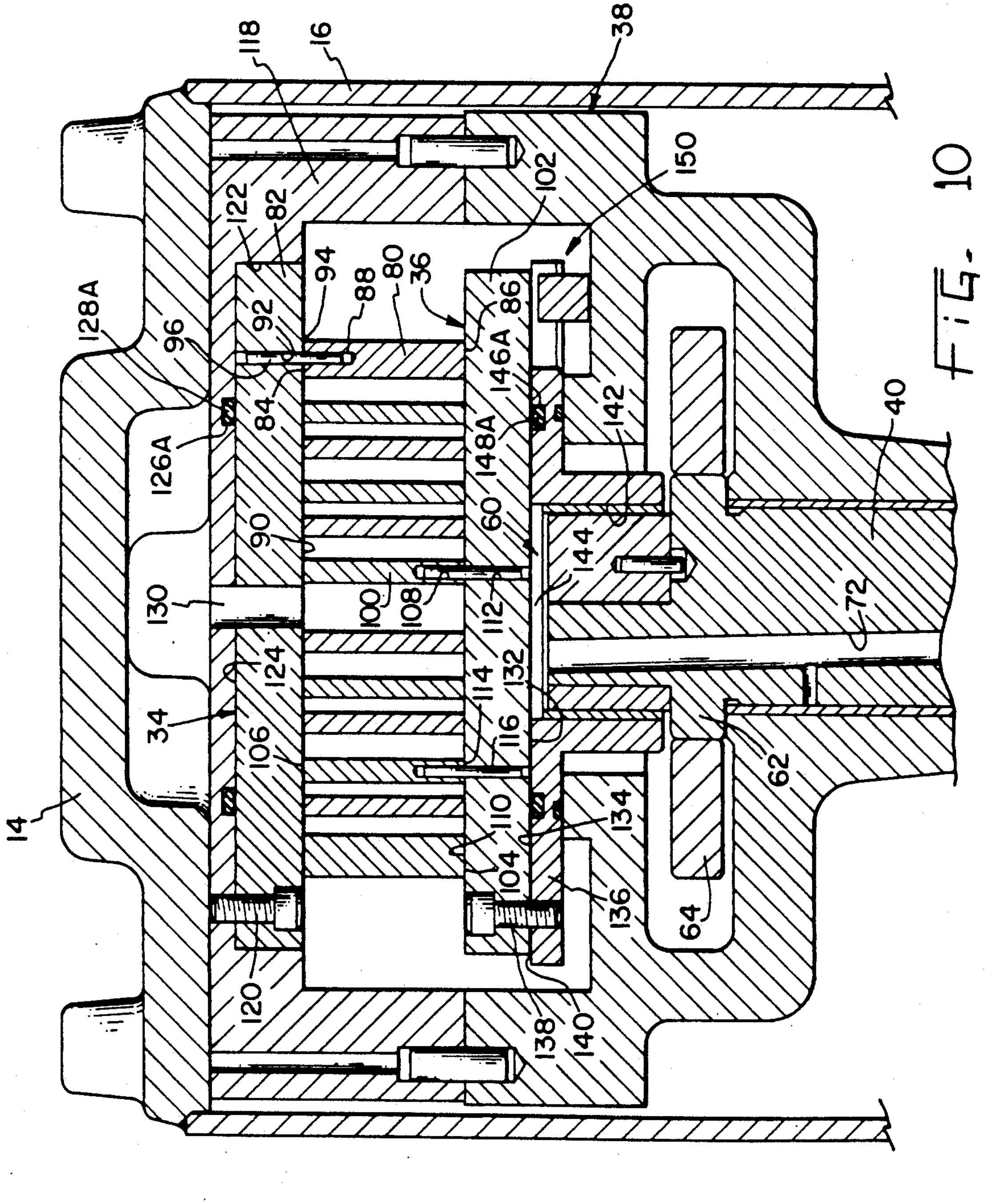
FIG. 10 is an enlarged fragmentary sectional view of an alternative embodiment of the present invention.

Similarly, a planar bottom surface 132 of plate member 102 is mounted to the planar top surface 134 of a drive hub member 136 by means of four countersunk screws 138, as illustrated in FIGS. 2 and 3. A planar interface 140 is defined between bottom surface 132 and top surface 134. Drive hub member 134 includes a central opening 142 in which eccentric crankpin and roller assembly 60 is rotatably journalled. During operation of compressor 10, oil at discharge pressure from sump 68 is pumped through oil passageway 72 to a region 144 defined by bottom surface 132, central opening 142, and assembly 60, as shown in FIG. 2. To prevent radially outward leakage of fluid from region 144 along interface 140, an annular seal groove 146 is formed in bottom surface 132, which houses an annular elastomeric O-ring seal 148. An alternative embodiment as shown in FIG. 10 wherein groove 126A and seal 128A are located on frame 118. Similarly, groove 146A and seal 148A could be located on hub member 136.

According to the embodiment of the invention shown in FIGS. 2-4, eccentric crankpin and roller assembly 60 constitutes a conventional swing-link mechanism to provide radial compliance of orbiting scroll member assembly 36 with fixed scroll member assembly 34. A conventional Oldham Ring assembly 150 prevents rotation of orbiting scroll member assembly, 36, while permitting orbiting motion thereof.

Radial compliance of an orbiting scroll member with a fixed scroll member is provided by an alternative embodiment of the present invention, illustrated in FIGS. 5-9, wherein identical reference numerals are used for components that are unchanged from the embodiment of FIGS. 2-4, and primed reference numerals are used to identify modified components.

Figure 5:
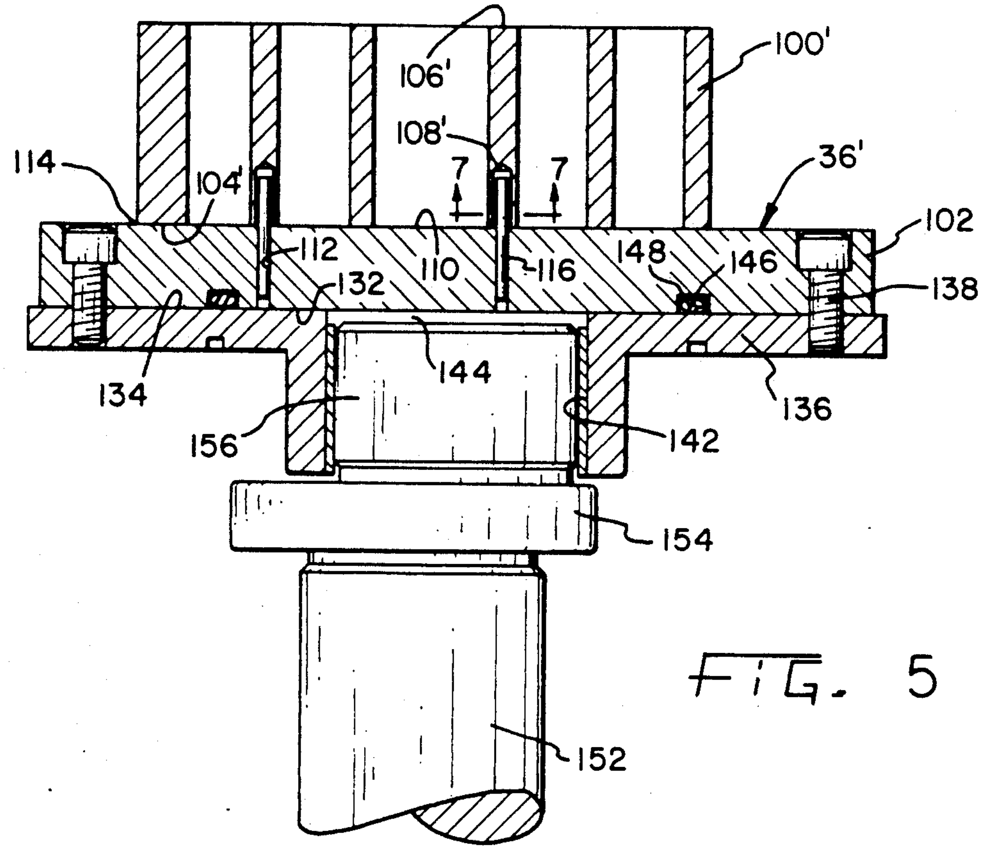
FIG. 5 is a partial sectional view of an alternative embodiment of an orbiting scroll member assembly and crankshaft for use in the compressor of FIG. 1.
Figure 6:
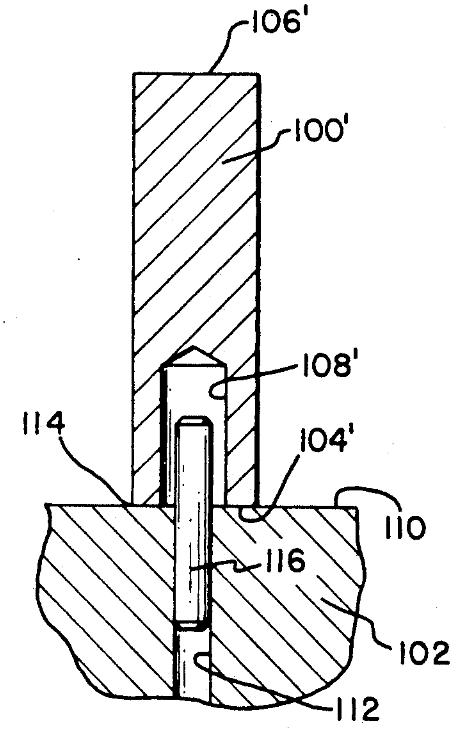
FIG. 6 is an enlarged fragmentary sectional view of the orbiting scroll member assembly of FIG. 5, particularly showing a scroll wrap mounting pin loosely disposed within an oversized pin-receiving hole.
Figure 11:
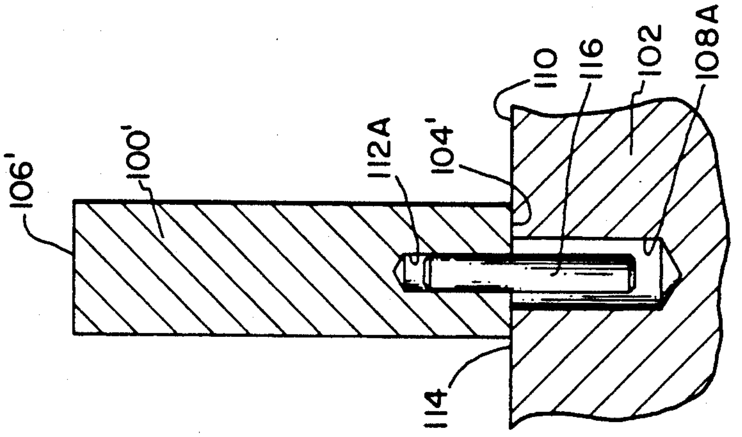
FIG. 11 is an enlarged fragmentary sectional view showing an alternative embodiment of the scroll wrap mounting pin assembly.

Referring now to FIGS. 5 and 6, an orbiting scroll member assembly 36' capable of providing radial compliance includes a wrap member 100' in which blind bores 108' are oversized with respect to the end portion of pin member 116 received therein. Consequently, wrap member 100' is capable cf experiencing sliding movement relative to plate member 102 along planar interface 114. In other words, wrap member 100' is permitted to slide on face surface 110 of plate member 102 to the extent that the clearance between pin member 116 and blind bore 108' will permit. Radial compliance is accomplished by the radial loading forces that are produced by the wrap-to-wrap following action and centrifugal forces acting on wrap member 100' during compressor operation. Alternatively, oversized bore 108A could be provided in plate member 102, with the pin 116 being press fit within bore 112A in wrap member 100' as shown in FIG. 11.

Referring to FIG. 5, a crankshaft 152 having only a thrust plate portion 154 and an eccentric crank portion 156 may be used in this alternative embodiment of the present invention. Specifically, crank portion 156 is journalled within central opening 142 of drive hub member 136 and imparts orbiting motion thereto.

Figure 7:
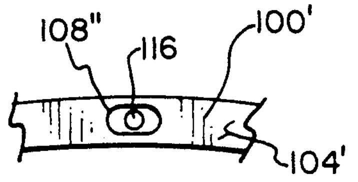
FIG. 7 is an enlarged fragmentary sectional view of the orbiting scroll member assembly of FIG. 5, taken along the line 7—7 in FIG. 5 and viewed in the direction of the arrows, particularly showing one configuration for the mounting pin and pin-receiving hole.
Figure 8:
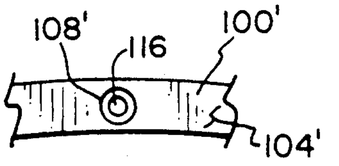
FIG. 8 is a view similar to that shown in FIG. 7, particularly showing an alternative configuration for the mounting pin and pin-receiving hole.

FIGS. 7 and 8 illustrate alternative configurations for the oversized blind bores in which pin members 116 are loosely received to perform radial compliance. Specifically, FIG. 7 shows a generally oval cross-sectional shape for an axial blind bore 108″ opening onto involute end surface 104′ of wrap member 100′, whereas FIG. 8 shows a blind bore 108′ having a generally round cross-sectional shape. While the clearance permitted between the pin members and the blind bores will vary depending upon various factors, a range of 0.0005 to 0.002 inches is suggested. Also, it is contemplated that a combination of bore configurations may be utilized for a given orbiting scroll member assembly.

Figure 9:
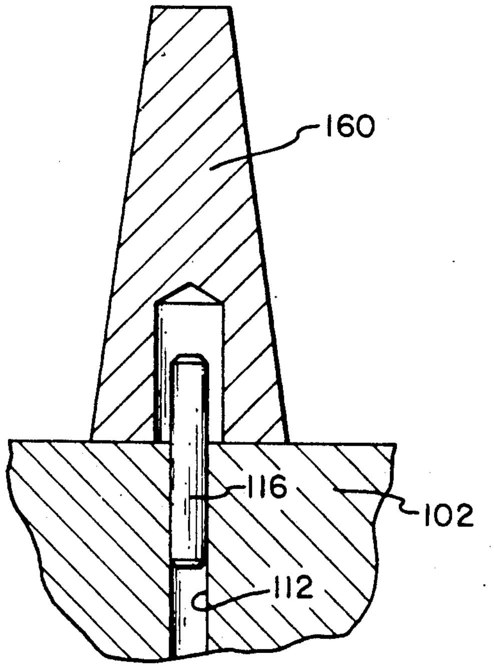
FIG. 9 is a view similar to that shown in FIG. 6, particularly showing the involute wrap element as having an alternative trapezoidal cross-sectional shape.

With reference to FIGS. 6 and 9, the wrap member associated with either the fixed scroll member assembly or the orbiting scroll member assembly of the present invention may assume either a rectangular cross-sectional shape, as shown in FIG. 6, or an isosceles trapezoid cross-sectional shape, as shown in FIG. 9, wherein each shape has its own particular advantages. For instance, in the rectangular design of FIG. 6, blind bores 108′ may be formed so as to open on either end surface 104′ for an orbiting scroll member assembly, or on the axially opposite end surface 106′ for use in a fixed scroll member assembly. In other words, the same basic wrap member part may be used for both the fixed and orbiting scroll member assemblies, provided that the pin-receiving bores are made on opposite axial ends of the wrap member.

In FIG. 9, a wrap member 160 having an isosceles trapezoid cross-sectional shape is shown connected to plate member 102 of an orbiting scroll member assembly. Necessarily, a mirror-image wrap member is used for the fixed scroll member assembly in order to provide proper sealing. A wrap member having a trapezoidal cross-sectional shape provides a larger pressure force for the wrap member against the end plate. Additionally, the wrap member has greater structural strength for its interaction with the pin members.

In the method of fabricating the scroll member assemblies of the present invention, there is provided an involute wrap member which extends involutely about a central axis and has a planar involute axial end surface. A plurality of axial bores opening onto the involute axial end surface are provided either during initial formation of the wrap member, by molding or the like, or by subsequent machining. Also, a plate member is formed with a planar face surface, onto which a plurality of axial bores open, wherein the bores correspond in number and location to the bores in the wrap member.

A plurality of pin members corresponding to both the bores in the wrap member and the bores in the plate member are used to interconnect the wrap member and the plate member, wherein each pin member has one end adapted to be received within a bore in the wrap member and another end adapted to be received within a corresponding bore in the plate member. With the pin members already received within the bores of either member, the wrap member and the plate member are interconnected by placing the involute axial end surface of the wrap member adjacent the face surface of the plate member such that the plurality of axial bores in the wrap member are correspondingly axially aligned with the plurality of axial bores in the plate member. At the same time, the pin members extend between and have their respective ends received within corresponding axially aligned bores in the wrap member and the plate member, respectively.

It will be appreciated that a wrap member according to the present invention may be constructed by a molding process that utilizes plastic, aluminum, ceramic, powdered metal, or any other suitable material. The molding process will be such that the wrap member can be used with as little additional machining as possible, thereby significantly reducing the cost of making the scroll parts. The molding process also permits the incorporation of a variety of tip seal geometries into the molded wrap member without requiring additional machining.

It will also be appreciated that the location of the pin-receiving bores in the respective wrap members and plate members of both the fixed and orbiting scroll member assemblies of a scroll-type compressor incorporating the present invention are such that the required geometry between the fixed and orbiting scroll member wraps is obtained. Furthermore, at least two pin members and associated bores in the wrap member and plate member are required to properly locate the wrap member on the end plate member.

It will be appreciated that the foregoing description of various embodiments of the invention is presented by way of illustration only and not by way of any limitation, and that various alternatives and modifications may be made to the illustrated embodiments without departing from the spirit and scope of the invention.

What is claimed is:

1. A scroll member assembly for use as a fixed or orbiting scroll member in a scroll-type compressor, comprising:

an end plate member having a planar face surface;

an involute wrap member extending involutely about a central axis and having a planar involute axial end surface, said wrap member being contactingly adjacent said plate member such that said involute axial end surface and said face surface define a planar involute interface therebetween; and interconnecting means spaced along said planar involute interface for interconnecting said wrap member and said plate member, said interconnecting means including a plurality of axial bores in said wrap member opening onto said involute axial end surface, a plurality of axial bores in said plate member opening onto said face surface, wherein each one of said plurality of axial bores in said wrap member is axially aligned with a respective one of said plurality of axial bores in said plate member, and a plurality of pin members each being received within a respective bore in said plate member and extending across said planar involute interface and being received within a corresponding bore in said wrap member, one of said plurality of bores in said wrap member and said plurality of bores in said plate member are oversized with respect to said corresponding plurality of pin members received therein, such that said wrap member is movable with respect to said plate member in a plane parallel to said planar involute interface between said involute axial end surface of said wrap member and said face surface of said plate member.

2. The scroll member assembly of claim 1 in which: said plurality of axial bores in said wrap member comprise blind bores.

3. The scroll member assembly of claim 1 in which: the cross-sectional shape of said wrap member is that of an isosceles trapezoid having its wide base end adjacent said plate member.

4. The scroll member assembly of claim 1 in which: the cross-sectional shape of said wrap member is that of a rectangle, wherein said wrap member has two substantially identical oppositely facing involute axial end surfaces, said plurality of axial bores in said wrap member opening onto a predetermined one of said two involute axial end surfaces, whereby the intended use of said scroll member assembly as either a fixed scroll member or an orbiting scroll member is predetermined.

5. The scroll member assembly of claim 1 in which: said plurality of pin members are loosely received within said plurality of axial bores in said wrap member.

6. The scroll member assembly of claim 1, in combination with a hermetic scroll compressor apparatus including a scroll compressor mechanism within a hermetically sealed housing, in which:

said compressor mechanism includes a stationary frame member to which said plate member is fixedly mounted.

7. The combination of claim 6 wherein said plate member includes a planar back surface mounted adjacent a planar mounting surface of said frame member to establish a planar interface therebetween, and further comprising:

a discharge passageway providing fluid communication through said plate member, across said planar interface, and into said frame member, said discharge passage comprising a central passage in said plate member and a corresponding axially aligned passage in said frame member; and seal means, circumscribing said discharge passageway within said planar interface between said plate member and said frame member, for preventing leakage of fluid from within said discharge passageway radially outwardly along said planar interface.

8. The scroll member assembly of claim 1, in combination with a hermetic scroll compressor apparatus including a scroll compressor mechanism within a hermetically sealed housing, in which:

said compressor mechanism includes drive means operably coupled to said plate member for imparting orbiting motion to said scroll member assembly.

9. The combination of claim 8 in which:

said drive means comprises a drive hub member to which said plate member is fixedly mounted, means for preventing rotation of said drive hub member, and a rotatable crankshaft having an eccentric drive portion operably coupled to said drive hub member to impart orbiting motion thereto.

10. The combination of claim 9 wherein said drive hub member includes a central opening into which said eccentric drive portion is received, and said plate member includes a planar back surface mounted adjacent a planar mounting surface of said drive hub member to establish a planar interface therebetween, said central opening intersecting with said planar interface, and further comprising:

seal means, circumscribing said central opening within said planar interface between said plate member and said drive hub member, for preventing leakage of fluid from within said central opening radially outwardly along said planar interface.

11. A scroll member assembly for use as an orbitally driven scroll member in a scroll-type compressor, wherein the scroll member is capable of achieving radial compliance with a fixed scroll member of the compressor, comprising:

an end plate member having a face surface;

an involute wrap member having an involute axial end surface, said wrap member being contactingly adjacent said plate member such that said involute axial end surface and said face surface define a sliding interface therebetween; and interconnecting means for interconnecting said wrap member and said plate member, said interconnecting means including a plurality of axial bores in said wrap member opening onto said involute axial end surface, a plurality of axial bores in said plate member opening onto said face surface, wherein each one of said plurality of axial bores in said wrap member is axially aligned with a respective one of said plurality of axial bores in said plate member, and a plurality of pin members each being received within a respective bore in said plate member and a corresponding bore in said wrap member, one of said plurality of bores in said wrap member and said plurality of bores in said plate member being oversized with respect to said corresponding plurality of pin members received therein such that said wrap member is movable with respect to said plate member along said sliding interface therebetween.

12. The scroll member assembly of claim 11 in which: said plurality of pin members are loosely received within said plurality of axial bores in said wrap member.

13. The scroll member assembly of claim 11, in combination with a hermetic scroll compressor apparatus including a scroll compressor mechanism within a hermetically sealed housing, in which:

said compressor mechanism includes drive means operably coupled to said plate member for imparting orbiting motion to said scroll member assembly, said drive means comprises a drive hub member to which said plate member is fixedly mounted, means for preventing rotation of said drive hub member, and a rotatable crankshaft having an eccentric drive portion operably coupled to said drive hub member to impart orbiting motion thereto.

14. The combination of claim 13 wherein said drive hub member includes a central opening into which said eccentric drive portion is received, and said plate member includes a planar back surface mounted adjacent a planar mounting surface of said drive hub member to establish a planar interface therebetween, said central opening intersecting with said planar interface, and further comprising:

seal means, circumscribing said central opening within said planar interface between said plate member and said drive hub member, for preventing leakage of fluid from within said central opening radially outwardly along said planar interface.

15. In a hermetic scroll compressor apparatus including a scroll compressor mechanism within a hermetically sealed housing, wherein the scroll compressor mechanism includes a stationary frame member having a planar mounting surface, a scroll member assembly for use as a fixed or orbiting scroll member, comprising:

an end plate member fixedly mounted to the stationary frame member, said end plate member having a planar face surface and a planar back surface, said planar back surface being mounted adjacent the planar mounting surface of the frame member to establish a planar interface therebetween;

an involute wrap member extending involutely about a central axis and having a planar involute axial end surface, said wrap member being contactingly adjacent said plate member such that said involute axial end surface and said face surface define a planar involute interface therebetween;

interconnecting means spaced along said planar involute interface for interconnecting said wrap member and said plate member, said interconnecting means including a plurality of axial bores in said wrap member opening onto said involute axial end surface, a plurality of axial bores in said plate member opening onto said face surface, wherein each one of said plurality of axial bores in said wrap member is axially aligned with a respective one of said plurality of axial bores in said plate member, and a plurality of pin members each being received within a respective bore in said plate member and extending across said planar involute interface and being received within a corresponding bore in said wrap member;

a discharge passageway providing fluid communication through said plate member, across said planar interface, and into said frame member, said discharge passage comprising a central passage in said plate member and a corresponding axially aligned passage in said frame member; and seal means, circumscribing said discharge passageway within said planar interface between said plate member and said frame member, for preventing leakage of fluid from within said discharge passageway radially outwardly along said planar interface, said seal means comprising an annular groove formed in one of said planar back surface of said plate member and said planar mounting surface of said frame member, and an annular seal element disposed within said groove.

16. In a hermetic scroll compressor apparatus including a scroll compressor mechanism within a hermetically sealed housing, a scroll member assembly for use as a fixed or orbiting scroll member, comprising:

an end plate member having a planar face surface;

an involute wrap member extending involutely about a central axis and having a planar involute axial end surface, said wrap member being contactingly adjacent said plate member such that said involute axial end surface and said face surface define a planar involute interface therebetween;

interconnecting means spaced along said planar involute interface for interconnecting said wrap member and said plate member, said interconnecting means including a plurality of axial bores in said wrap member opening onto said involute axial end surface, a plurality of axial bores in said plate member opening onto said face surface, wherein each one of said plurality of axial bores in said wrap member is axially aligned with a respective one of said plurality of axial bores in said plate member, and a plurality of pin members each being received within a respective bore in said plate member and extending across said planar involute interface and being received within a corresponding bore in said wrap member;

drive means operably coupled to said plate member for imparting orbiting motion to said plate member, said drive means including a drive hub member to which said plate member is fixedly mounted, means for preventing rotation of said drive hub member, and a rotatable crankshaft having an eccentric drive portion operably coupled to said drive hub member to impart orbiting motion thereto, said drive hub member having a central opening into which said eccentric drive portion is received, and said plate member includes a planar back surface mounted adjacent a planar mounting surface of said drive hub member to establish a planar interface therebetween, said central opening intersecting with said planar interface; and seal means, circumscribing said central opening within said planar interface between said plate member and said drive hub member, for preventing leakage of fluid from within said central opening radially outwardly along said planar interface, said seal means including an annular groove formed in one of said planar back surface of said plate member and said planar mounting surface of said drive hub member, and an annular seal element disposed within said groove.

17. A method of fabricating a scroll member assembly for use in a scroll-type compressor, comprising the steps of:

providing an involute wrap member extending involutely about a central axis and having a planar involute axial end surface, said wrap member having a plurality of axial bores therein opening onto said involute axial end surface thereof;

providing a plate member having a planar face surface and a plurality of axial bores opening onto said face surface, wherein each one of said plurality of axial bores in said plate member corresponds to a respective one of said plurality of axial bores in said wrap member;

providing a plurality of pin members corresponding to said plurality of axial bores in said wrap member and said plurality of axial bores in said plate member, each member having one end adapted to be received within one of said plurality of axial bores in said wrap member and another end adapted to be received within a corresponding one of said plurality of axial bores in said plate member; and interconnecting said wrap member and said plate member, by placing said involute axial end surface of said member adjacent said face surface of said plate member such that said plurality of axial bores in said wrap member are correspondingly axially aligned with said plurality of axial bores in said plate member and by inserting said plurality of pin members in said bores in said wrap member and said plate member such that said pins extend between and have their respective ends received within corresponding axially aligned bores in said wrap member and said plate member, respectively, one of said plurality of bores in said wrap member and said plurality of bores in said plate member being provided oversized with respect to said respective ends of said corresponding plurality of pin members received therein, whereby said wrap member is movable with respect to said plate member in a plane parallel to said planar face surface thereof.

18. The method of claim 17, wherein said wrap member has two substantially identical oppositely facing involute axial end surfaces, in which:

said step of providing a plurality of axial bores in said wrap member is performed such that said plurality of axial bores open onto a predetermined one of said two involute axial end surfaces, whereby the intended use of said scroll member assembly as either a fixed scroll member or an orbiting scroll member is predetermined.

19. The method of claim 17, and further comprising the steps of:

providing a hermetic scroll compressor apparatus including a scroll compressor mechanism within a hermetically sealed housing, said scroll compressor mechanism including a stationary frame member; and fixedly mounting said plate member to said stationary frame of said scroll compressor mechanism.

20. The method of claim 17, and further comprising the steps of:

providing a hermetic scroll compressor apparatus including a scroll compressor mechanism within a hermetically sealed housing, said scroll compressor mechanism including a drive hub member operably coupled to drive means for imparting orbiting motion to a drive hub member; and fixedly mounting said plate member to said drive hub member.

* * * * *

UNITED STATES PATENT AND TRADEMARK OFFICE

CERTIFICATE OF CORRECTION

PATENT NO. : 5,044,904

DATED : September 3, 1991

INVENTOR(S) : Hubert Richardson, Jr.

It is certified that error appears in the above-identified patent and that said Letters Patent is hereby corrected as shown below:

Claim 17, column 12, line 48, after "said" insert --wrap--.

Signed and Sealed this

Second Day of March, 1993

*Attest:*

STEPHEN G. KUNIN

*Attesting Officer*

*Acting Commissioner of Patents and Trademarks*